United States Patent Office 3,037,864
Patented June 5, 1962

---

3,037,864
CULINARY MIXES
William T. Bedenk, Greenhills, Ohio, assignor to The Procter & Gamble Company, Cincinnati, Ohio, a corporation of Ohio
No Drawing. Filed Feb. 18, 1959, Ser. No. 793,958
8 Claims. (Cl. 99—94)

This invention relates to prepared culinary mixes. More particularly, it relates to dry mixes containing sugar, flour and shortening from which baking batters can be prepared by the addition of liquid materials.

So-called "dry" prepared mixes used for baking are made by combining sugar, flour, shortening, and other ingredients including leavening, milk solids, egg solids, flavoring, and coloring, to form a free-flowing granular mixture. To prepare these dry mixes for baking, liquid materials such as water, milk, or eggs are added, and the combination is beaten to form a homogeneous mixture and to incorporate air. The resulting batter is then baked.

It has been found that when dry prepared mixes have aged, as by sitting on a grocer's shelf, changes occur in the mixes which affect the quality and appearance of goods baked from these mixes. Crusts on products made from aged mixes tend to be hard and brittle. Such crusts cannot shrink when a freshly baked product cools, and, as a result, become wrinkled. Frequently the crust separates entirely from the rest of the baked product. In addition the crusts do not brown in a satisfactory manner and present an undesirable appearance. The formation of such a crust on cakes makes them difficult to ice or arrange in layers. The problem of unsatisfactory crusts is accentuated when batters are permitted to stand for a period of time before baking.

The crust problem appears to be particularly acute when insufficient radiant heat contacts the top of the batters during baking. This may occur when one container of batter is placed directly over another in an oven. This condition may also be caused by the fact that the air temperature of an oven will rise rapidly during heating and will cause the thermostatic controls to shut off the heating element before the walls of the oven have had a chance to "soak up" heat. As a result very little radiant heat is available during the initial stages of baking. This is a common occurrence in the home.

It has now been found that by means of the present invention dry mixes can be made which will produce baked goods superior to those made from prior art mixes, and which will be less susceptible to the aforementioned problems.

Accordingly, it is an object of this invention to provide prepared culinary mixes which have keeping qualities superior to those of prior art mixes.

Another object is to provide culinary mixes which are more tolerant than are prior art mixes to adverse conditions of batter making and baking.

Other objects and advantageous features will be apparent from the following detailed description.

In general, the invention comprises a culinary mix containing sugar, farinaceous material, and shortening, said shortening containing from 1.5% to 20%, by weight of shortening, of at least one ester combining a monomeric polyhydric alcohol and a saturated fatty acid having more than 20 carbon atoms, said fatty acid having an iodine value not greater than about 10, said ester having at least one free hydroxyl group per molecule of polyhydric alcohol, and said shortening containing not more than 50% fatty material which is solid at room temperature.

Mixes included within the scope of this invention must contain sugar, farinaceous material, and shortening. It is to be understood that a wide variety of baked goods can be prepared from mixes which contain these ingredients, but, for purposes of illustration, the specific application of this invention to cake mixes will be set forth in detail.

The composition of mixes suitable for baking cakes can vary, but representative compositions are within the following ranges:

| | Percent |
|---|---|
| Sugar | 28 to 45 |
| Farinaceous material | 38 to 48 |
| Shortening | 4 to 25 |
| Leavening agents | 1 to 4 |
| Cocoa | 0 to 7 |
| Egg solids | 0 to 5 |
| Nonfat dried milk solids | 0 to 5 |
| Flavoring (including spices) | 0 to 2 |
| Coloring | Minor amounts |

In general, the types and qualities of the above materials are those which are used in prior art mixes.

Suitable sugars include any of the commonly used granular sugars such as sucrose, dextrose, maltose, fructose, lactose, and brown and invert sugars. The sugar can also be in powdered form, and mixtures of more than one type of sugar can be used.

Farinaceous material customarily used in prepared cake mixes is bleached cake flour, containing at least 50% wheat flour. Up to 50% of the flour can be replaced by starch. If suitable emulsifying agents are used, a general purpose flour will also given good results.

Suitable shortenings include animal and vegetable fats, hydrogenated or unhydrogenated. However, the shortening should not contain more than about 50% of fatty material which is solid at room temperature, since it has been found that the presence of larger amounts of solids will result in baked products which are tough and small in size.

It is a critical part of the invention that the shortening contain from 1.5% to 20.0%, by weight of shortening, of at least one ester combining a monomeric polyhydric alcohol and a saturated fatty acid having more than 20 carbon atoms. The fatty acid must be sufficiently saturated so as to have an iodine value not greater than about 10, and the ester should have at least one free hydroxyl group per molecule of polyhydric alcohol.

Glycerine is a very satisfactory monomeric polyhydric alcohol for use in esters of this invention, and behenic acid partial esters of glycerine such as monobehenin and dibehenin are especially preferred. However, other polyhydric alcohols such as glycol, sorbitol and mannitol can also serve as a polyhydric alcohol in the ester. Monosaccharides and disaccharides, such as dextrose, sucrose and lactose are also to be considered as polyhydric alcohols for the purpose of this invention. Polyhydric alcohols where two identical alcohols are connected as by an ether linkage are not within the scope of this invention.

Although the fatty acid portion of the ester has been defined in terms of specific acids, it is to be understood that natural oils can also be used to form mixtures of esters suitable for addition to shortenings of the present invention. Rapeseed oil and herring oil are particularly suitable for this purpose. Although peanut oil contains some $C_{22}$ fatty acids, the amount is too small to provide a sufficient amount of partial esters to be within the scope of this invention.

The partial esters can be formed in a number of ways which are known to those skilled in the art. For example, fatty acids can be directly combined with the polyhydric alcohols. The partial esters can also be formed by reaction of an excess of polyhydric alcohol with complete esters of the fatty acid. Under proper conditions the fatty acids can be hydrogenated either before or after the formation of the partial esters.

The partial esters can also be made directly in combination with the shortening. For example, a mixture of suitable fatty acid triglycerides can be reacted with an excess of glycerine. Alternatively, a mixture of the proper glycerides can be subjected to either random or directed rearrangement to effect the proper composition.

It is to be understood that this invention is not to be limited to any specific process for preparing the partial esters, and that any suitable method can be used.

The emulsifying ability of the partial esters of fatty acids having more than 20 carbon atoms may be sufficient to produce a desired size and structure in baked goods. However, it may also be desirable to add other emulsifying agents, particularly in the case of so-called "high ratio" cake mixes, in which the ratios of sugar-to-flour are greater than 1:1.

Suitable emulsifiers for use in mixes of this invention are partially esterified polyhydric compounds having surface-active properties. These include, but are not limited to, mono- and diglycerides of higher fatty acids containing from 12 to 20 carbon atoms, such as monostearin, monopalmitin, monoolein, and dipalmitin; higher fatty acid esters of sugars such as sucrose partial palmitate and sucrose partial oleate; and phosphoric and sulfuric acid esters, such as dodecyl glyceryl ether sulfate and monostearin phosphate. Other suitable partial esters include derivatives of carboxylic acids such as lactic, citric, and tartaric acids. An example of such a derivative is lactoglyceryl palmitate. Suitable emulsifying agents also include polyoxyethylene ethers of fatty esters of polyhydric alcohols such as the polyoxyethylene ethers of sorbitan monostearate or the polyoxyethylene ethers of sorbitan distearate.

The use of esters of this invention is advantageous when the mixes are subjected to a large amount of mixing or stress. The esters are particularly desirable in mixes in which a homogeneous blend of sugar, shortening, and farinaceous material is formed, and this blend is thereafter subjected to simultaneous shearing and crushing forces such as forces encountered when the blend is passed between two rollers moving at different speeds. Mixes of this type are disclosed in the copending application of Mills, Serial No. 727,784, filed April 11, 1958, now U.S. Patent 2,874,053, issued February 17, 1959.

The following example will serve to illustrate the invention with greater particularity.

EXAMPLE I

*Yellow Cake*

Two cake mixes (A and B) were prepared having the following composition:

| | Percent |
|---|---|
| Sugar (industrial fine, granulated sucrose) | 41.2 |
| Flour (soft wheat cake flour) | 34.3 |
| Shortening [1] | 13.0 |
| Nonfat dried milk solids | 4.0 |
| Salt | 1.0 |
| Soda | 0.64 |
| Monocalcium phosphate (anhydrous) | 0.53 |
| Sodium acid pyrophosphate | 0.53 |
| Dry egg white solids | 1.5 |
| Dry egg yolk solids | 3.2 |
| Flavoring | 0.1 |

[1] The shortening was prepared by melting together the following and plasticizing by rapidly cooling with agitation.

88% vegetable oil mixture comprising about 80% soybean oil and 20% cottonseed oil, which had been refined, bleached, deodorized, and hydrogenated to an iodine value of about 70,
   3% soybean oil which had been superglycerinated to form a mixture containing about 40% monoglyceride, 40% diglyceride, and 20% triglyceride, and hydrogenated to an iodine value of about 80,
   9% Mix A—Rapeseed oil which had been superglycerinated to form a mixture containing about 40% monoglyceride, 40% diglyceride and 20% triglyceride, (about 3.6% $C_{22}$ monoglyceride and diglyceride), and hydrogenated to an iodine value of about 8,
   Mix B—Cottonseed oil which had been superglycerinated to form a mixture containing about 40% monoglyceride, 40% diglyceride, and 20% triglyceride (essentially no $C_{22}$ monoglyceride or diglyceride), and hydrogenated to an iodine value of about 8.

Each mix was made by blending together thoroughly the sugar, flour, and shortening in a Hobart mixer, and then passing this blend through a roller mill. The roller mill had three rolls revolving at different speeds with a speed ratio of 3 to 1 between the first two rolls, and of 2 to 1 between the second and third rolls. After the milling step the remaining ingredients were added and the final mixture was subjected to an impact grinding to break up any agglomerates or large particles present. The mixes were aged for one week at a temperature of 100° F. and a relative humidity of 70%. This aging is considered to be equivalent to about one month of normal storage.

Batter was then made by adding 1⅓ cups of water to 20 oz. of each of the mixes and mixing at medium speed on a "Sunbeam" mixer for two minutes. Two 8-inch pans were filled with each batter. The pans were placed in an oven so that one pan of each mix was directly over and separated by about 6 inches from another pan of the same mix, and the batters were baked at 375° F.

The baked cakes were allowed to cool and were removed from the pans. The crusts were examined and graded according to the following scale:

| Grade | Crust Grading Scale—Description |
|---|---|
| 10.0 | Perfect crust. |
| 9.0 | Slightly pale. |
| 8.0 | Pale, slightly brittle. |
| 7.0 | Pale, brittle. |
| 6.0 | Pale, brittle, slightly wrinkled. |
| 5.0 | Very pale, brittle, hard, wrinkled. |
| 4.0 | Very pale, brittle, hard, wrinkled, lifted from cake. |
| 3.0 | Completely separated from cake. |

The following crust scores were shown for the two cakes:

| Cake | Score | |
|---|---|---|
| | Mix A | Mix B |
| Upper Cake | 9.0 | 9.0 |
| Lower Cake | 7.0 | 4.0 |

As can be seen from the above, the addition of a $C_{22}$ fatty ester to the mix resulted in a cake which was affected to a considerably less degree by the adverse baking conditions. Improvements can also be noted by the addition of these esters to other types of cakes such as chocolate, spice and white cakes. Improvement can also be achieved by the addition of the esters to prepared mixes for baked goods other than cakes, such as those for making brownies, cookies, etc.

What is claimed is:

1. A dry prepared culinary mix containing sugar, farinaceous material, and shortening, said shortening containing from 1.5% to 20%, by weight of shortening, of at least one ester combining directly a monomeric polyhydric alcohol and saturated fatty acid having more than 20 carbon atoms, said fatty acid having an iodine value not greater than about 10, said ester having at least one free hydroxyl group per molecule of polyhydric alcohol, and said shortening containing not more than 50% fatty material which is solid at room temperature.

2. A dry prepared culinary mix according to claim 1 wherein the fatty acid portion of the ester is derived from rapeseed oil.

3. A dry prepared culinary mix according to claim 1 wherein the fatty acid portion of the ester is derived from herring oil.

4. A dry prepared culinary mix according to claim 1 wherein the ester is a monoglyceride of a fatty acid having more than 20 carbon atoms.

5. A dry prepared culinary mix according to claim 1 wherein the ester is behenic monoglyceride.

6. A dry prepared culinary mix comprising from 28% to 45% sugar, from 38% to 48% farinaceous material, and from 4% to 25% shortening, said shortening containing from 1.5% to 20%, by weight of shortening, of at least one ester combining directly a monomeric polyhydric alcohol and saturated fatty acid having more than 20 carbon atoms, said fatty acid having an iodine value not greater than about 10, said ester having at least one free hydroxyl group per molecule of polyhydric alcohol, and said shortening containing not more than 50% fatty material which is solid at room temperature.

7. A dry prepared culinary mix according to claim 6 wherein the ester is a monoglyceride derived from rapeseed oil.

8. A dry prepared culinary mix according to claim 6 wherein the ester is behenic monoglyceride.

References Cited in the file of this patent

UNITED STATES PATENTS

| | | |
|---|---|---|
| 2,132,395 | Coith | Oct. 11, 1938 |
| 2,815,285 | Holman et al. | Dec. 3, 1957 |
| 2,815,286 | Andre et al. | Dec. 3, 1957 |
| 2,864,705 | Schulman | Dec. 16, 1958 |
| 2,868,652 | Brock | Jan. 13, 1959 |
| 2,875,065 | Thompson | Feb. 24, 1959 |

UNITED STATES PATENT OFFICE
CERTIFICATE OF CORRECTION

Patent No. 3,037,864                            June 5, 1962

William T. Bedenk

It is hereby certified that error appears in the above numbered patent requiring correction and that the said Letters Patent should read as corrected below.

Column 2, line 29, for "given" read -- give --; column 4, the heading to the first table should appear as shown below instead of as in the patent:

Crust Grading Scale

| Grade | Description |
|-------|-------------|

Signed and sealed this 9th day of October 1962.

(SEAL)
Attest:

ERNEST W. SWIDER
Attesting Officer

DAVID L. LADD
Commissioner of Patents